W. O. STRONG.
Distributer for Grain Bins.
No. 34,379. Patented Feb. 11, 1862.
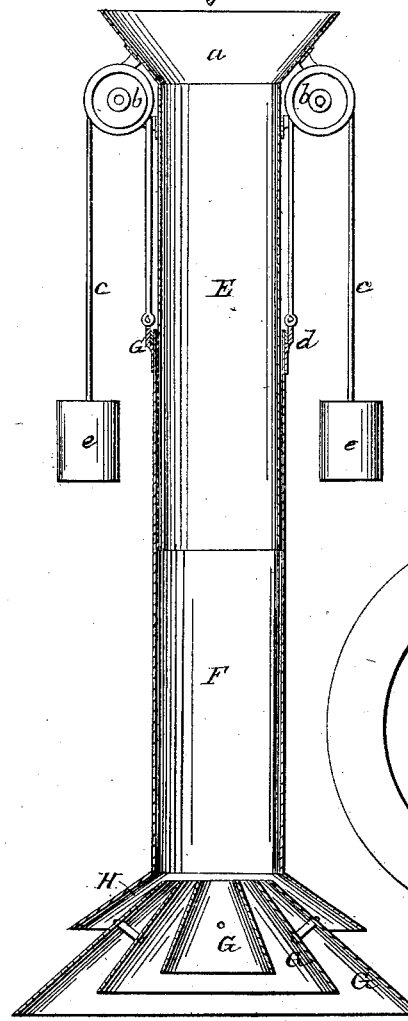
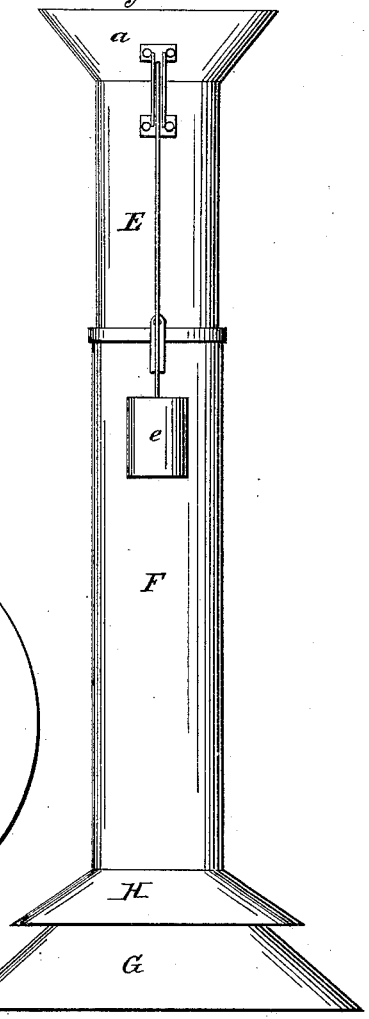
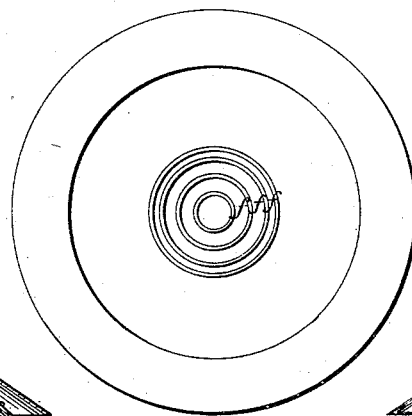
Witnesses.
William B. M'Ivey.
Andrew C. Blackwood.
Inventor.
W. O. Strong.

UNITED STATES PATENT OFFICE.

WILLIAM O. STRONG, OF DETROIT, MICHIGAN.

IMPROVED DEVICE FOR DISTRIBUTING GRAIN IN ELEVATOR-BINS.

Specification forming part of Letters Patent No. 34,379, dated February 11, 1862.

*To all whom it may concern:*

Be it known that I, WILLIAM O. STRONG, of Detroit, in the county of Wayne and State of Michigan, have invented a new and useful Machine for Distributing Grain in Filling or Loading Elevator-Bins; and I do hereby declare that the following is a full and exact description.

When grain is spouted from an elevator into a bin, it gradually accumulates in the form of a cone, which form the top of the grain retains while the bin is being filled. The heavy and better part of the grain from the force it acquires in its descent drives the lighter and poorer particles before it down the sides of the cone, and they gather at the sides of the bin. When the grain is drawn out, the poor part thus thrown to the sides is the last that comes from the bin, the grain being usually drawn from the center of the bottom, making the grain last drawn off of a lower grade than the general contents of the bin.

My invention is intended to obviate this difficulty and to distribute the grain evenly throughout the bin, so that it will all be of the same grade when drawn out.

My invention consists of a telescopic pipe, with balance-weights and pulley so adjusted that the length of the pipe may be varied. The upper end of the pipe is provided with a funnel-shaped mouth, and to the lower end are attached a series of hollow truncated cones open at both ends, varied in size, and so arranged that the grain which enters at the top of the pipe and passing down strikes the cones and is deflected at various angles is caused to fall in a shower or spray over the bottom of the bin, and so to be distributed evenly without reference to the weight or size of the particles.

To enable others skilled in the art to make and use my invention, I will proceed to describe its construction and operation, having reference to the annexed drawings, in which—

Figure 1 is an elevation; Fig. 2, a vertical section; Fig. 3, a section of the pipe and plan of the cones.

Like letters refer to like parts in each figure.

E and F are the two sections of the telescopic pipe.

$a$ is the funnel or receiver.

$b\ b$ are pulleys attached to E, over which pass cords $c$, one end of which is fastened to F at $d\ d$, and the other ends are fixed to the balance-weights $e\ e$.

G G G are the truncated cones, placed one within the other and so arranged that there shall be circular openings $f f f$ between each, which openings have equal areas.

H is a guard or guide to prevent the grain falling on the outer cone from being deflected in a horizontal line. The grain entering the funnel $a$ passes down the pipes E and F, and falling upon the cones G G G is deflected and caused to take new directions corresponding with the angles of the different cones.

It is evident that the pipes may be made square and truncated pyramids substituted for the cones, or any other irregular form of pipe and deflectors may be used, provided the angular arrangement be retained. I do not, therefore, wish to confine myself to the circular form of pipe and cones above described, nor do I wish to confine myself to the use of a telescopic pipe, as it may in some cases be more convenient to use a fixed pipe; but What I do claim, and desire to secure by Letters Patent, is—

The even distribution of grain in bins by means of the pipe E F, made either telescopic or fixed, and the truncated cones G G G or their equivalents, arranged substantially in the manner and for the purpose set forth.

W. O. STRONG.

Witnesses:
   A. G. LINDSAY,
   ISAAC DE GRAFF.